United States Patent
Takagi et al.

(10) Patent No.: US 7,188,702 B2
(45) Date of Patent: Mar. 13, 2007

(54) ELECTRIC POWER STEERING APPARATUS

(75) Inventors: Masanori Takagi, Wako (JP); Takashi Kuribayashi, Wako (JP); Atsuhiko Yoneda, Wako (JP)

(73) Assignee: Honda Giken Kogyo Kabushiki Kaisha, Minato-ku (JP)

(*) Notice: Subject to any disclaimer, the term of this patent is extended or adjusted under 35 U.S.C. 154(b) by 66 days.

(21) Appl. No.: 10/439,606

(22) Filed: May 16, 2003

(65) Prior Publication Data

US 2005/0045414 A1  Mar. 3, 2005

(30) Foreign Application Priority Data

Jul. 2, 2002 (JP) .............................. 2002-192882

(51) Int. Cl.
*B62D 5/04* (2006.01)

(52) U.S. Cl. ....................................... 180/446; 701/41

(58) Field of Classification Search ................. 180/443, 180/444, 446; 701/41, 42

See application file for complete search history.

(56) References Cited

U.S. PATENT DOCUMENTS

| 4,837,690 | A | * | 6/1989 | Morishita et al. ............. 701/43 |
| 4,886,136 | A | * | 12/1989 | Kozuka et al. ............. 180/446 |
| 5,239,490 | A | * | 8/1993 | Masaki et al. ................. 702/41 |
| 6,427,104 | B1 | * | 7/2002 | Matsushita et al. ........... 701/41 |
| 6,681,165 | B2 | * | 1/2004 | Shibasaki et al. ............. 701/41 |
| 2002/0125064 | A1 | * | 9/2002 | Mori et al. .................. 180/444 |

FOREIGN PATENT DOCUMENTS

| DE | 102 06 955 | 2/2003 |
| EP | 1 241 073 | 9/2002 |
| JP | 2000-279000 | 10/2000 |

* cited by examiner

*Primary Examiner*—Anne Marie Boehler
(74) *Attorney, Agent, or Firm*—Hamre, Schumann, Mueller & Larson PC

(57) ABSTRACT

An electric power steering apparatus is provided, which has a first device for detection of steering torque, a motor, a motor drive unit, a second device for determining a target current based upon at least a signal of steering torque, a third device for detection of a motor current, and a control unit for generating a signal for motor drive based upon at least a deviation between the target current and motor current and transmitting the signal for motor drive to the motor drive unit. The apparatus has a feature that the control unit includes a fourth device for weakening a magnetic field within the motor according to the deviation or a value computed based upon the deviation.

2 Claims, 10 Drawing Sheets

ELECTRIC POWER STEERING APPARATUS

FIELD OF THE INVENTION

The present invention relates to an electric power steering apparatus, which is able to relieve the steering torque required of a driver by exerting power produced by a motor on the steering line of a vehicle.

BACKGROUND OF THE INVENTION

A motor used for a conventional electric power steering apparatus has characteristics in terms of torque, rotational velocity and current as shown in FIGS. 1 and 2. When an output torque Tm is small, a corresponding rotational velocity Nm is large and a current Im is small. On the other hand, when an output torque Tm is large, a corresponding rotational velocity Nm is small and a current Im is large. FIG. 1 is an example showing output characteristics of a motor, prioritizing output torque. FIG. 2 is the other example, prioritizing rotational velocity instead.

Since the motor has these characteristics, it has been difficult to realize the good steering feeling of a driver for two occasions simultaneously when he or she makes steering while a vehicle is at a standstill and traveling. If a motor having characteristics shown in FIG. 1 is used for an electric power steering system, the motor is able to provide an output power required for steering while a vehicle is at a standstill, namely large output torque and small rotational velocity, as indicated by a point A1 in FIG. 1. On the other hand, a motor output power required for quick steering during vehicular travel is such that an output torque is small and a rotational velocity is large as shown by a point A2 in FIG. 1. Therefore, the motor fails to provide sufficient output power in terms of rotational velocity, thereby making a driver feel steering heavier.

If a motor with characteristics shown in FIG. 2 is used for an electric power steering system instead, steering feeling will deteriorate when steering is made while a vehicle is at a standstill.

A need for larger motor, which has characteristics shown in FIG. 3, arises so as to achieve an electric power steering apparatus which is able to maintain good steering feeling of a driver at both points A1 and A2. A larger motor leads to an increase in size and weight of an apparatus, thereby sacrificing fuel economy and steering feeling of a driver due to an increase in the moment of inertia of motor.

Japanese Published Patent Application 2000-279000 discloses an approach for solving the problem described above by introducing control of a motor. As shown in FIG. 4, the document reports a method, which employs current for weakening a magnetic field within a motor while an output torque Tm required of the motor is small. In this way, the magnetic field within the motor can be weakened so that a rotational velocity Nm can be increased in order to accommodate both points A1 and A2.

FIG. 5 is a block diagram showing a control unit disclosed in Japanese Published Patent Application 2000-279000. In the control unit, following processes are performed. A block 131 for conversion of torque current computes a q-axis command current Iqo based upon a command torque To. A device 114 for detection of motor current detects currents, for example Iu and Iv for U and V phases of a motor respectively. An adder 133 computes a current of W phase based upon the currents Iu and Iv. A block 134 for dq conversion performs dq conversion for current. An adder 122 computes a deviation ΔIq between a q-axis command current Iqo and q-axis actual current Iqr. Similarly, an adder 124 computes a deviation ΔId between a d-axis command current Ido, which is compensated with a d-axis compensation current Id by an adder 123, and a d-axis actual current Idr. PI control blocks 125 and 126 compute command voltages Vdo and Vqo, respectively. A block 129 for inverse dq conversion executes inverse conversion for current. A block 130 for PWM conversion computes a PWM control pattern. A drive circuit 113 delivers an output current for driving the motor. And a rotation sensor 132 and a block 135 for detection of angle compute a rotational angle θ.

A CPU normally executes a computation of deviation between target and feedback values and controls a command input according to a command signal derived from the deviation. In a current feedback loop, current is detected by a transformer in the device 114, which is amplified and then sampled at predetermined intervals. Detected currents Iu and Iv for respective phases obtained in this way and a current Iw computed from these currents undergo dq conversion performed by the block 134 so that the d-axis and q-axis components thereof make the target values for respective axes.

A d-axis component of loaded current represents a current of magnetic field and a q-axis component represents a torque current. In this way, the feedback control of current for controlling an output torque is performed so that the q-axis component can be equal to a target value for output torque.

Further, this example has a device 138 for determining d-axis compensation current. The device 138, which supplies a current for weakening a magnetic field to a motor 80 by adding a d-axis compensation current Id to a d-axis command current Ido when a motor command torque To is small, weakens the magnetic field within the motor 80. In this way, the device 138 increases a rotational velocity Nm of motor 80, thereby accommodates the requirements associated with the points A1 and A2 shown in FIG. 4.

However, the method disclosed in Japanese Published Patent Application 2000-279000 still poses a problem. At the point A3 in FIG. 4 where output power required of a motor is small as a result of the small requirements for output torque Tm and rotational velocity Nm during vehicular travel, the current for weakening a magnetic field within a motor is supplied to the motor unnecessarily. It will lead to an increase in the current Im of motor, resulting in sacrificing of fuel economy.

Also according to the method, the current for weakening the magnetic field is supplied to the motor while a command torque for the motor is small so that the magnetic field within the motor can be weakened and consequently a rotational velocity Nm can be increased. When the motor is operating at the upper limit of rotational velocity Nm, practicing of faster steering results in unsuccessful assist by the motor since the motor is not able to increase the rotational velocity. More specifically, the motor, which serves as a source of resistant torque for a steering line in this case, generates a torque which differs greatly from that actually required for steering. Since a command torque To, in such a case, is controlled to increase so as to decrease current for weakening the magnetic field within motor, the motor accordingly works to increase output torque Tm reducing rotational velocity Nm. In this way, a motor output shifts from points A4 to A5 in FIG. 6 and thereby a driver feels steering heavier.

As described above, a motor used for an electric power steering apparatus should satisfy two different requirements. First, the motor should satisfy a requirement that output torque Tm is large while rotational velocity Nm is small when steering is made while a vehicle is at a standstill. Second, the motor should satisfy the other requirement that output torque Tm is small while rotational velocity Nm is large, reverse relative to the first requirement, when steering is made during vehicular travel. If the motor fails to satisfy the requirements, a driver experiences poor steering with heavier feeling. On the other hand, the introduction of a larger motor will sacrifice the fuel economy of a vehicle. The approach described above, which employs current for weakening the magnetic field within a motor, still poses problems associated with fuel economy and steering feeling.

SUMMARY OF THE INVENTION

The object of the present invention is to provide an electric steering power apparatus, which provides smooth steering feeling without sacrificing fuel economy and the size of a motor.

The present invention provides an electric power steering apparatus having a first device for detection of steering torque, a motor, a motor drive unit, a second device for determining a target current to be supplied to the motor based upon at least a signal of steering torque delivered by the first device, a third device for detection of a motor current and a control unit for generating a signal for motor drive based upon at least a deviation between the target current and motor current and transmitting the signal for motor drive to the motor drive unit. The apparatus has a feature that the control unit includes a fourth device for weakening a magnetic field within the motor according to the deviation or a value computed based upon the deviation.

According to the present invention, the rotational velocity of motor can be increased by weakening the magnetic field within motor only when both the current deviation and an output power required of the motor are large. On the other hand, when a small output power is required of the motor in small and slow steering during vehicular travel, the apparatus can prevent the unnecessary current for weakening the magnetic field from running through the motor, thereby achieving good fuel economy. The apparatus also allows the use of a compact motor and smooth steering feeling with the optimum control of rotational velocity of the motor.

The present invention also provides an electric power steering apparatus having a first device for detection of steering torque, a motor, a motor drive unit, a second device for determining a target current to be supplied to the motor based upon at least a signal of steering torque delivered by the first device, a third device for detection of a motor current and a control unit for generating a signal for motor drive based upon at least a deviation between the target current and motor current and transmitting the signal for motor drive to the motor drive unit. The apparatus has a feature that the control unit includes a fourth device for weakening a magnetic field within the motor according to the motor current.

According to the present invention, only when the actual current is small, the apparatus can supply the current for weakening the magnetic field to the motor, thereby weakening the magnetic field within motor and increasing the rotational velocity thereof. When the motor is operating at the upper limit of rotational velocity, the apparatus can also restrain an undesirable operation of the motor to decrease the rotational velocity by increasing a command torque. The apparatus further allows the use of a compact motor and smooth steering feeling with the optimum control of rotational velocity of the motor.

The present invention further provides an electric power steering apparatus having a first device for detection of steering torque, a motor, a motor drive unit, a second device for determining a target current to be supplied to the motor based upon at least a signal of steering torque delivered by the first device, a third device for detection of a motor current, a fourth device for detection of a rotational velocity of the motor and a control unit for generating a signal for motor drive based upon at least a deviation between the target current and motor current and transmitting the signal for motor drive to the motor drive unit. The apparatus has a feature that the control unit includes a fifth device for weakening a magnetic field within the motor according to the rotational velocity of the motor.

The apparatus according to the present invention can selectively supply the current for weakening the magnetic field within motor only when the rotational velocity is large. In this way, the apparatus is free from supplying unnecessary current to the motor, thereby improving fuel economy. The apparatus also allows the use of a compact motor and smooth steering feeling with the optimum control of rotational velocity of the motor.

DESCRIPTION OF THE PREFERRED EMBODIMENTS

An embodiment of the present invention is now described referring to the accompanying drawings.

Figure 7:
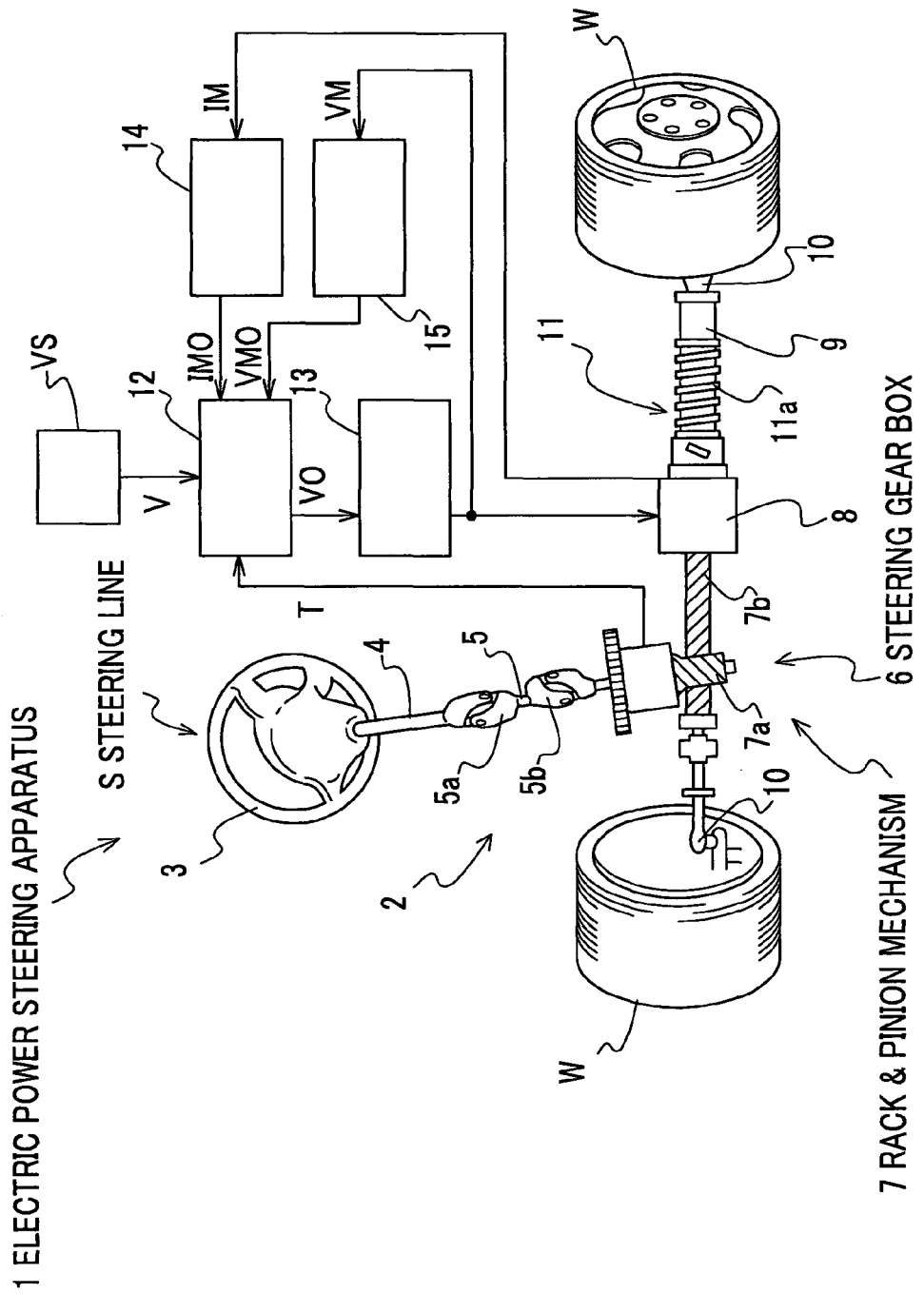
FIG. 7 is a figure showing an overall structure of electric power steering apparatus according to the present invention.

An overall structure of an electric power steering apparatus 1 is described referring to FIG. 7.

The electric power steering apparatus 1, which has a steering line S ranging from a steering wheel 3 to steered wheels W, exerts an assist torque on the steering line S in addition to the steering torque produced by a manual steering torque generator 2. A motor drive unit 13 generates a motor voltage VM based upon a signal VO for motor control delivered by a control unit 12. The motor drive unit 13 drives a motor 8 according to the motor voltage VM, thereby generating an assist torque to be combined with the manual steering torque produced by the manual steering torque generator 2.

In this embodiment, a three-phase brushless motor, for driving of which dq control is used, is selected for the motor 8.

In the manual steering torque generator 2, a pinion 7a of a rack & pinion mechanism 7 situated in a steering gear box 6 is coupled via a connecting shaft 5 with a steering shaft 4, which is formed integrally with the steering wheel 3. The connecting shaft 5 has universal joints 5a and 5b at both ends thereof. The rack & pinion mechanism 7, which has rack teeth 7b formed around a rack shaft 9 to mesh with the pinion 7a, converts the rotational movement of pinion 7a to the linear movement of rack shaft 9 in a lateral direction relative to the direction of vehicular travel. Forward steered wheels W are connected to the rack shaft 9 via tie rods 10.

The motor 8 is disposed on the rack shaft 9 coaxially so as to generate assist steering torque. The electric power steering apparatus 1 converts the rotation of motor 8 to thrust force via a ball screw mechanism 11 situated on the rack shaft 9 coaxially, thereby exerting the thrust force on the rack shaft 9, more specifically a ball screw shaft 11a.

The control unit 12 receives a signal V detected by a vehicle velocity sensor VS, a signal T detected by a steering torque sensor TS (not shown) and a signal IMO detected by a device 14 for detection of motor current. The control unit 12 determines the magnitude and direction of a motor current IM to be supplied to the motor 8 based upon the signals V, T and IMO, delivering a signal VO for motor control to the motor drive unit 13. The control unit 12 further judges based upon the signal T of steering torque and signal IMO of motor current whether or not execution of an assist is required of the electric power steering apparatus 1 and controls driving of the motor 8 accordingly. In this connection, the control unit 12 includes a Central Processing Unit (CPU) for executing various computations and processes, an input signal converter, a signal generator and a memory. The CPU is responsible for main control processes associated with the electric power steering apparatus 1.

In the present embodiment, a steering torque sensor TS refers to a first device for detection of steering torque and a device 14 for detection of motor current refers to a second device for detection of a motor current.

The vehicle velocity sensor VS detects the velocity of a vehicle by counting the number of pulses per unit time and transmits a signal V of vehicle velocity, which contains an analogue electric signal corresponding to a detected number of pulses, to the control unit 12. In this connection, another existing sensor may alternatively be shared instead of a dedicated sensor for the vehicle velocity sensor VS.

The steering torque sensor TS (not shown), which is disposed in the steering gear box 6, detects the magnitude and direction of steering torque exerted manually by a driver. The steering torque sensor TS transmits a signal T of steering torque, which contains an analogue electric signal corresponding to a detected steering torque, to the control unit 12. The signal T includes both magnitude and direction of manual steering torque. The direction of torque, clockwise or counterclockwise, is identified with one of plus and minus signs.

The device 14 for detection of motor current, which has, for example, a current transformer provided for each of windings of the motor 8, detects the magnitude and direction of a motor current IM actually running through the motor 8.

The device 14 also performs negative feedback with a signal IMO representative of a motor current IM to the control unit 12. A device 15 for detection of motor voltage detects a motor voltage VM and performs negative feedback with a signal VMO.

The motor drive unit 13 imposes a motor voltage VM on the motor 8 based upon a signal VO for motor control, thereby driving the motor 8. The motor drive unit 13 supplies each of the windings of motor 8 with a sinusoidal current via a pre-drive circuit and a Field Effect Transistor (FET) bridge according to the duty of a Pulse Width Modulation (PWM) signal, thereby performing vector control of the motor 8.

Figure 8:
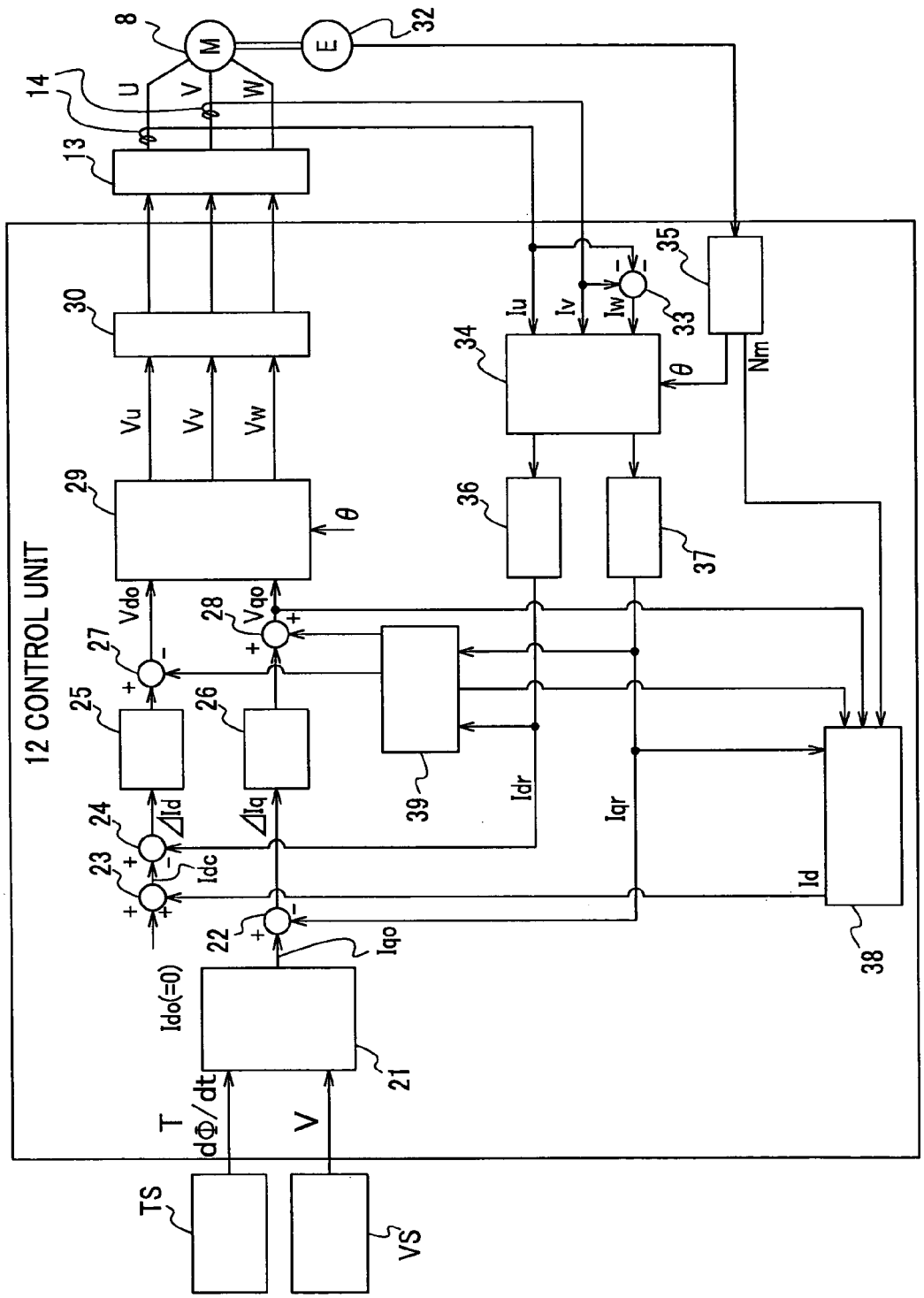
FIG. 8 is a block diagram showing a control unit according to the present invention.

The operation of control unit 12 is described referring to FIG. 8. The control unit 12 controls the motor 8 according to a command torque To with vector control expressed in a dq coordinate system. Namely, the control unit 12 performs vector control of the motor 8 so that an assist torque can be adapted to a steering torque T exerted on the steering wheel 3 of steering line S, which the steering torque sensor TS detects.

Using a device 21 for determination of q-axis target current, the control unit 12 first determines a command torque To with an expression (1) taking into account a steering torque T and a steering angular velocity $d\Phi/dt$ detected by the steering torque sensor TS and a signal V of vehicle velocity detected by the vehicle velocity sensor VS.

$$To = F(T, V, d\Phi/dt) \quad (1)$$

A function of F determines a command torque To.

The command torque To is then converted into a q-axis command current Iqo by torque-current conversion in the device 21 with an expression (2).

$$Iqo = G(To) \quad (2)$$

A function of G is for performing a predetermined torque-current conversion. A d-axis command current Ido is basically set to be zero.

A signal IMO of motor current sent by the device 14, which contains detected currents such as currents Iu and Iv for U and V phases of a motor, is detected by a current transformer. The signal IMO is amplified and then sampled at predetermined intervals. A detected current for each phase undergoes conversion executed by a dq conversion block 34 based upon a signal θ of motor rotation detected by a device for detection of rotational velocity of the motor, including a VR resolver 32 and a RD converter 35. Subsequently, after the current passes through attenuators 36 and 37, d-axis and q-axis actual currents (feedback currents), Idr and Iqr, are obtained. The attenuators 36 and 37 are able to eliminate high frequency noise which enters a feedback loop externally. Mechanical and electric switches with ON/OFF operation create noises in an engine room. PI control blocks 25 and 26 to be described later are susceptible to high frequency noises, which leads to a problem that steering feeling deteriorates due to unstable control caused by the noises. In this way, the attenuators 36 and 37 can solve the problem by elimination of high frequency noises.

An adder 22 computes a deviation ΔIq between a q-axis command current Iqo (target) and a q-axis actual current Iqr (feedback). An adder 23 performs d-axis current compensation for a d-axis command current Ido (=0) (target) with a d-axis compensation current Id. An adder 24 computes a deviation ΔId between a d-axis target current Idc for compensation delivered by the adder 23 and a d-axis actual current Idr (feedback). The adders 22 and 24 perform a computation with an expression (3).

$$\Delta Id = Idc - Idr$$

$$\Delta Iq = Iqo - Iqr \tag{3}$$

ΔId represents a d-axis current deviation and ΔIq represents a q-axis current deviation. In this embodiment, a device 21 for determining q-axis target current refers to a device for determining target current, and a d-axis target current Idc for compensation and a q-axis command current Iqo refer to target current.

The PI control blocks 25 and 26 perform proportional (P) and integral (I) control for a d-axis current deviation ΔId and a q-axis current deviation ΔIq respectively, thereby generating a d-axis command voltage Vdo and a q-axis command voltage Vqo. A dq inverse conversion block 29 performs dq inverse conversion for command voltages Vdo and Vqo, thereby converting the voltages Vdo and Vqo into command voltages Vu, Vv and Vw corresponding to respective phases of U, V and W. A PWM conversion block 30 converts these command voltages Vu, Vv and Vw to PWM duty signals. Each PWM duty signal, which triggers supply of sinusoidal current for each winding of the motor 8 (brushless motor) via a pre-drive circuit and an FET bridge circuit in the motor drive unit 13, initiates vector control for the motor 8.

In the present embodiment, a device 38 for determining d-axis compensation current determines a d-axis compensation current Id. And the adder 23 computes a d-axis target current Idc for compensation with an expression (4).

$$Idc = Ido + Id \tag{4}$$

A symbol of Id represents a d-axis compensation current delivered by the device 38. And a d-axis command current Ido is set to be zero. When a d-axis current is supplied according to the compensation current Id (negative value), a current for weakening the magnetic field within motor flows into the motor 8 and thereby the magnetic field of motor 8 is weakened. Consequently, the rotational velocity Nm of motor 8 can be increased.

Processes performed in the device 38 for determining d-axis compensation current is described.

Figure 9:
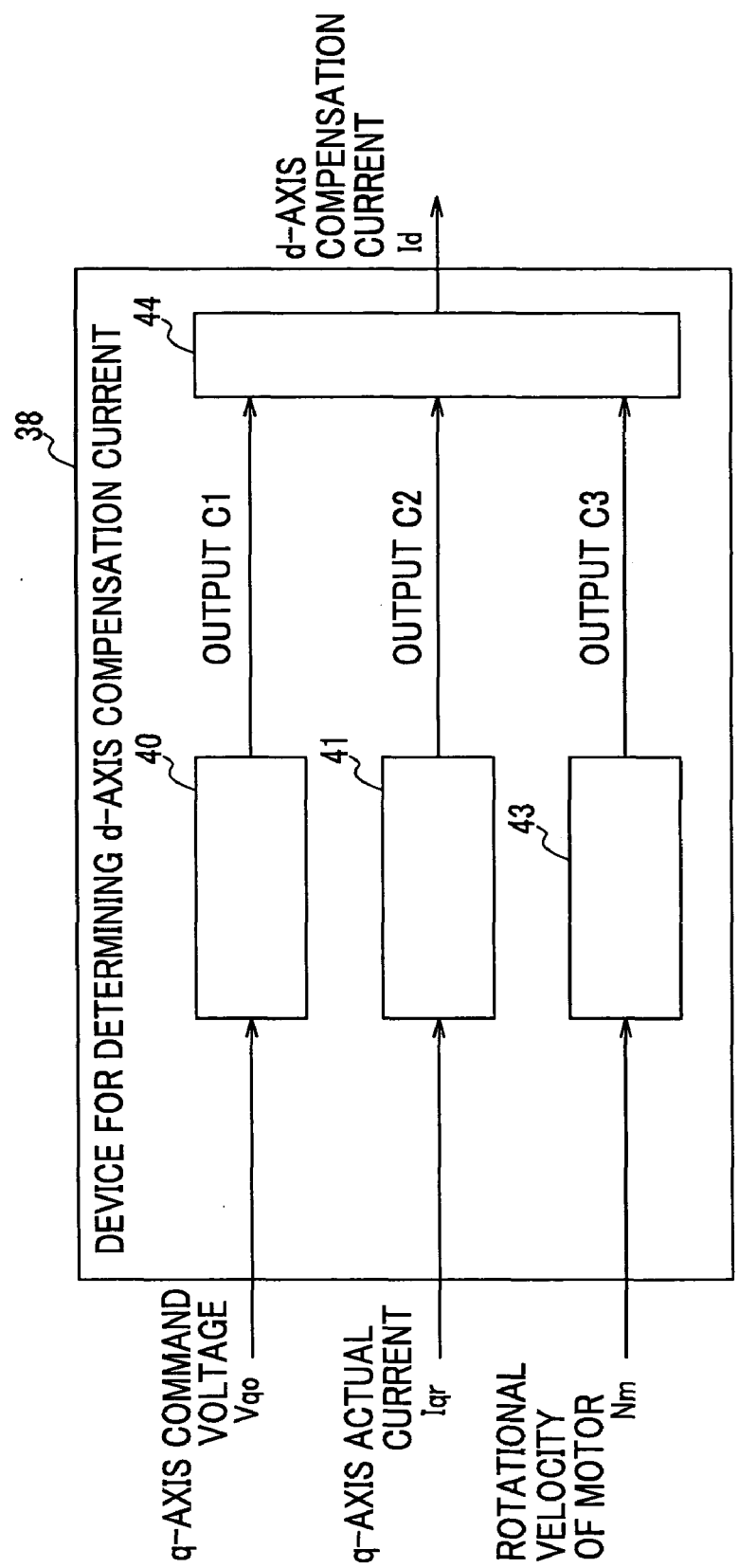
FIG. 9 is a functional block diagram showing a device for determining d-axis compensation current according to the present invention.
Figure 10:
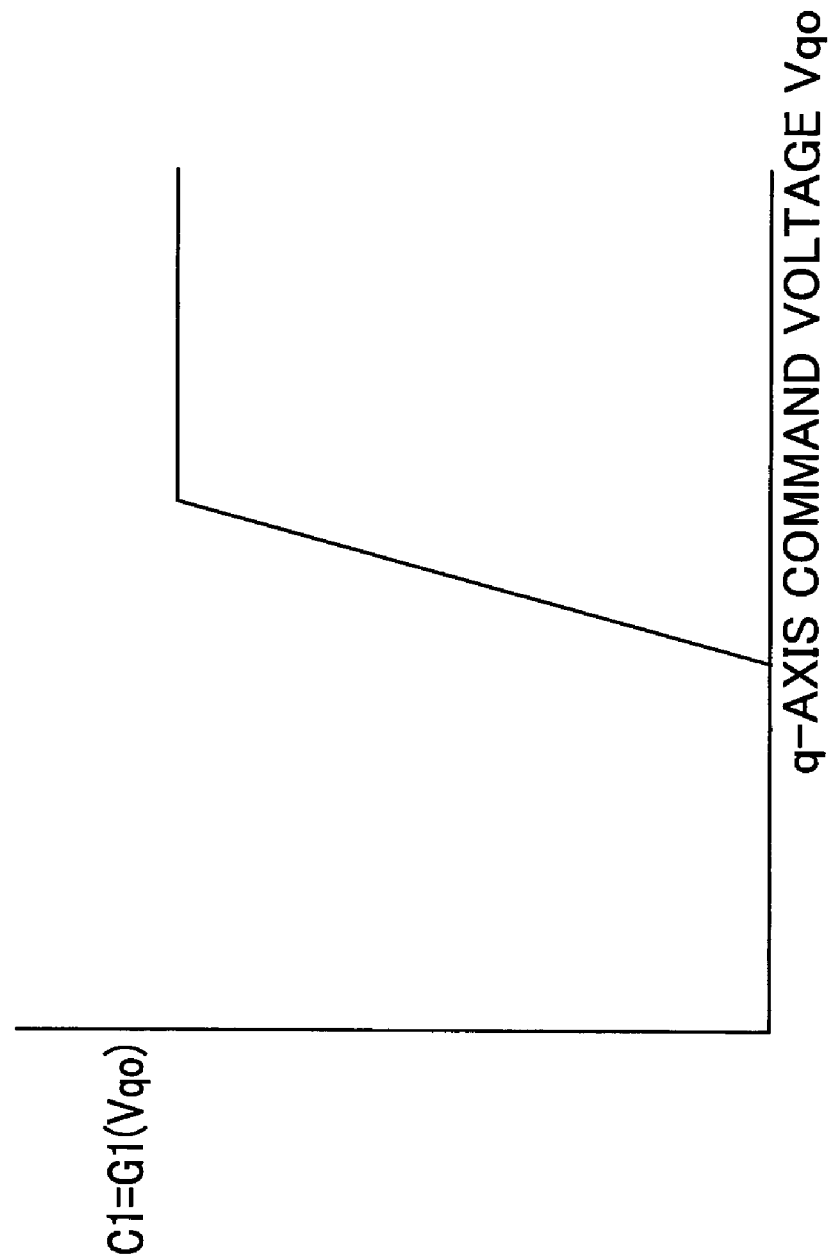
FIG. 10 is a figure showing a map used in a device for map processing based upon q-axis command voltage, according to the present invention.
Figure 11:
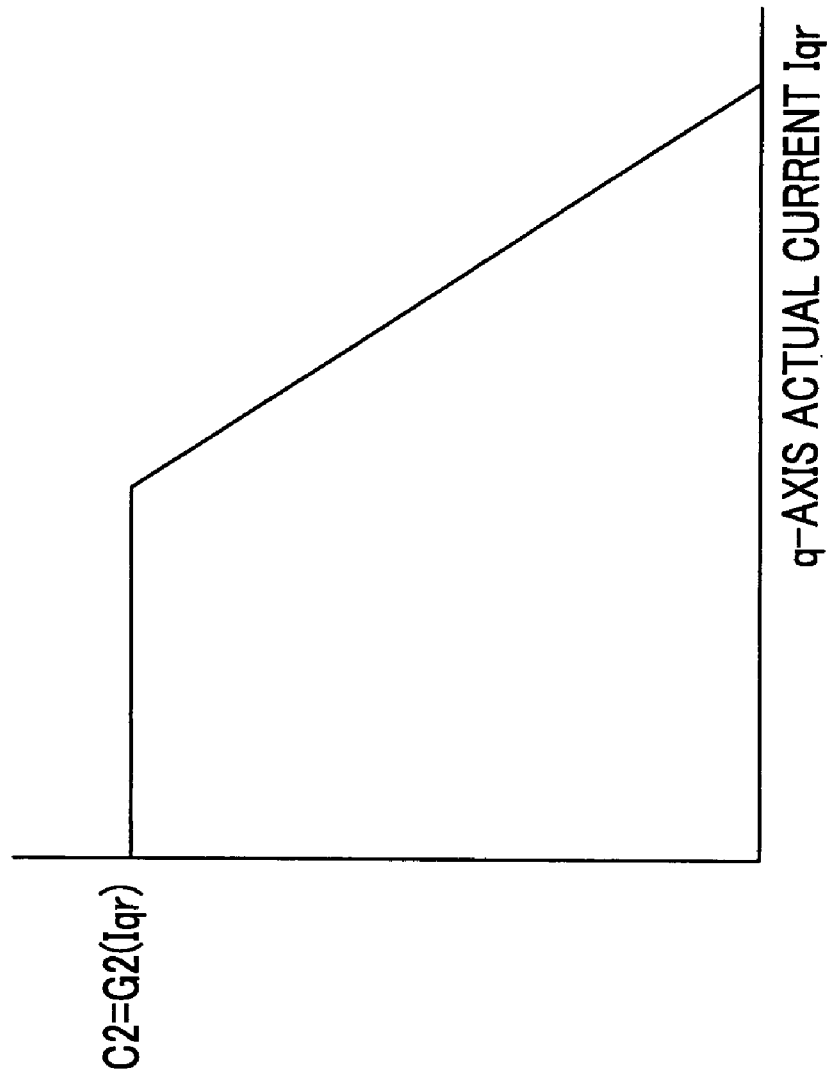
FIG. 11 is a figure showing a map used in a device for map processing based upon q-axis actual current, according to the present invention.
Figure 12:
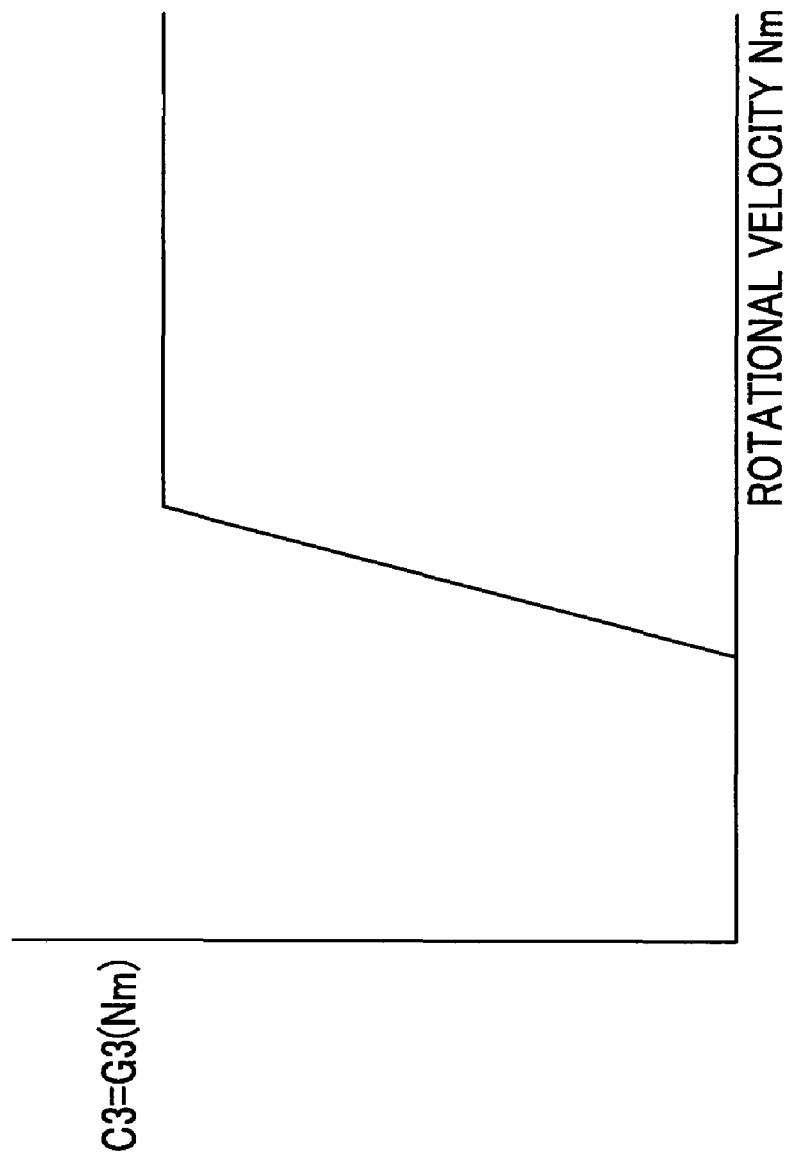
FIG. 12 is a figure showing a map used in a device for map processing based upon motor rotational velocity, according to the present invention.

FIG. 9 is a functional block diagram showing the device 38. FIG. 10 shows a map used in a portion 40 for map processing based upon q-axis command voltage. FIG. 11 shows a map used in a portion 41 for map processing based upon q-axis actual current. Also FIG. 12 shows a map used in a portion 43 for map processing based upon rotational velocity of motor.

The portion 40 disposed in the device 38 determines an output C1, which is a compensation current element obtained by map retrieval addressing with a q-axis command voltage Vqo. The portion 40 executes a conversion with an expression (5).

$$C1 = G1(Vqo) \tag{5}$$

Figure 1:
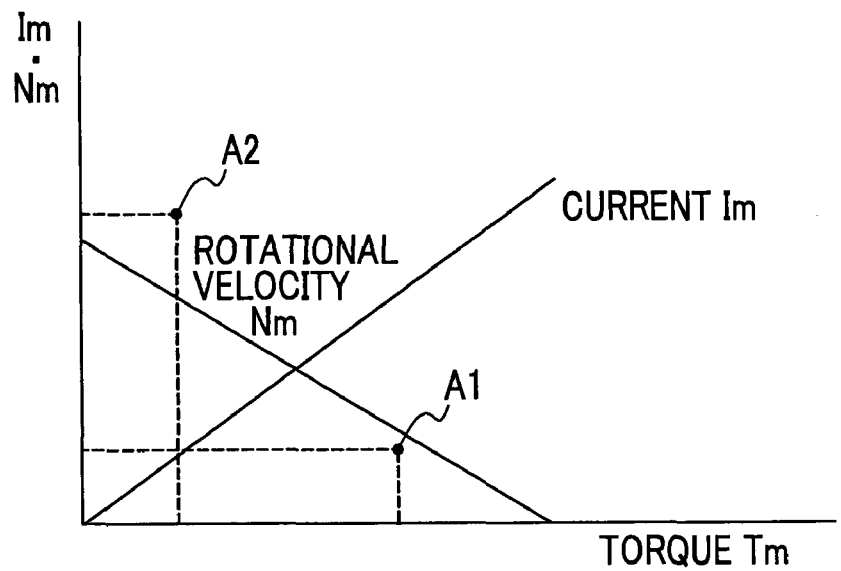
FIG. 1 is a graph illustrating the characteristics of a motor according to the prior art.
Figure 2:
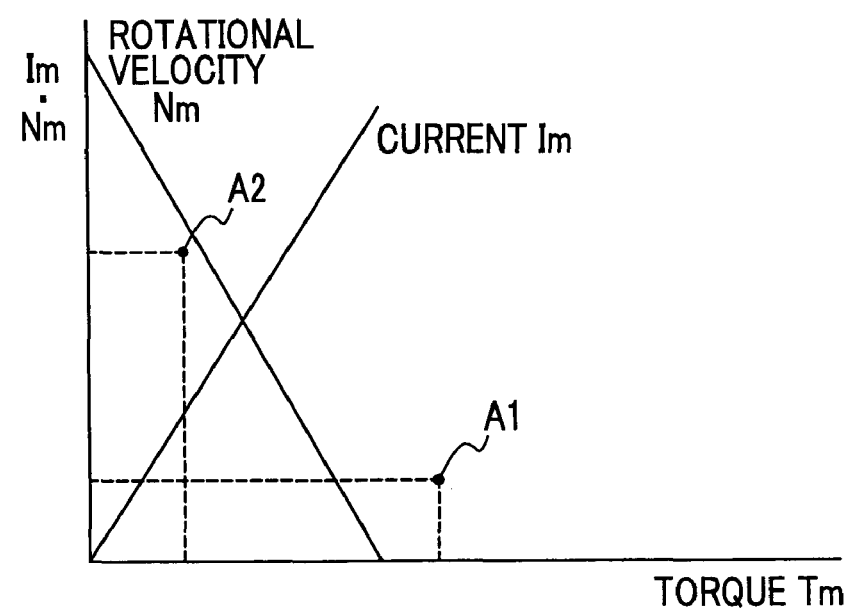
FIG. 2 is a graph illustrating the characteristics of a motor according to the prior art.
Figure 3:
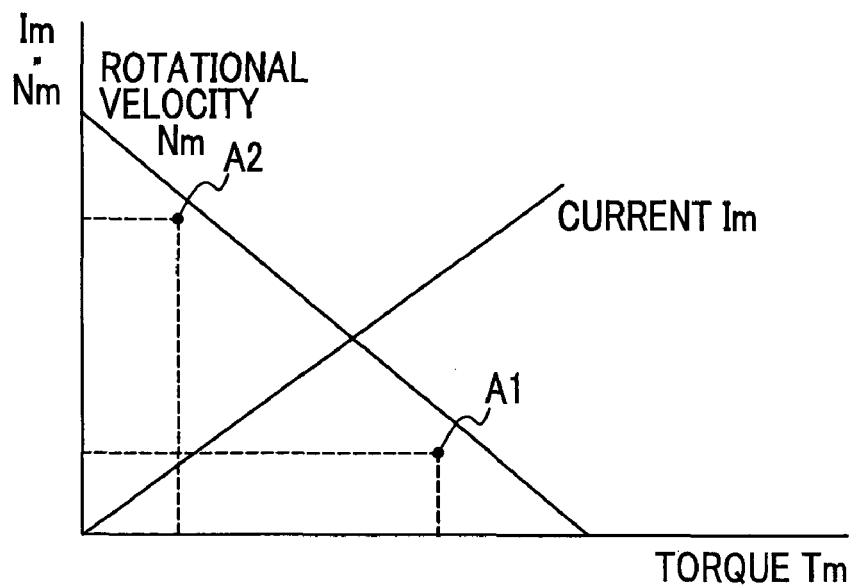
FIG. 3 is a graph illustrating the characteristics of a motor according to the prior art.
Figure 4:
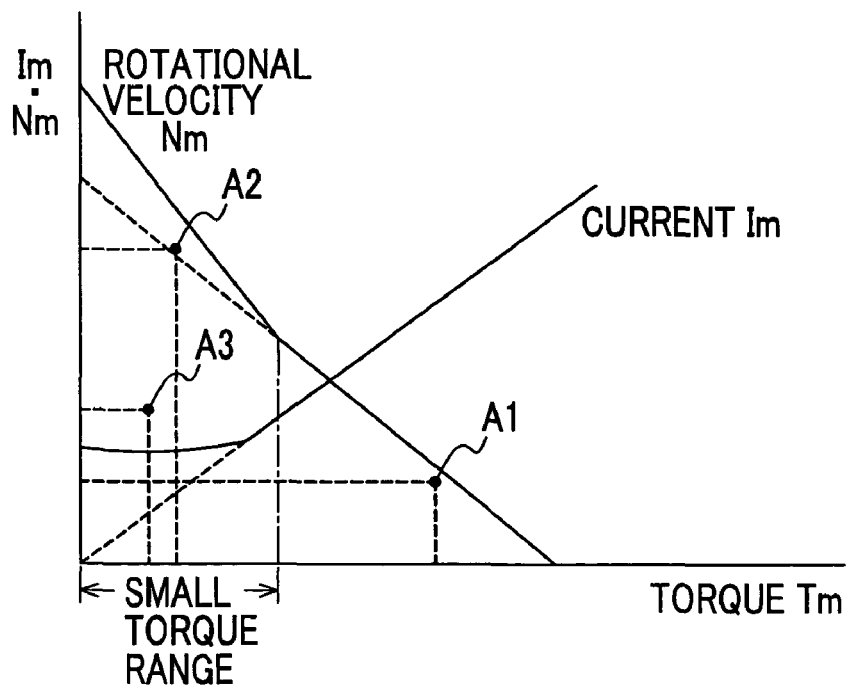
FIG. 4 is a graph illustrating the characteristics of a motor according to the prior art.
Figure 5:
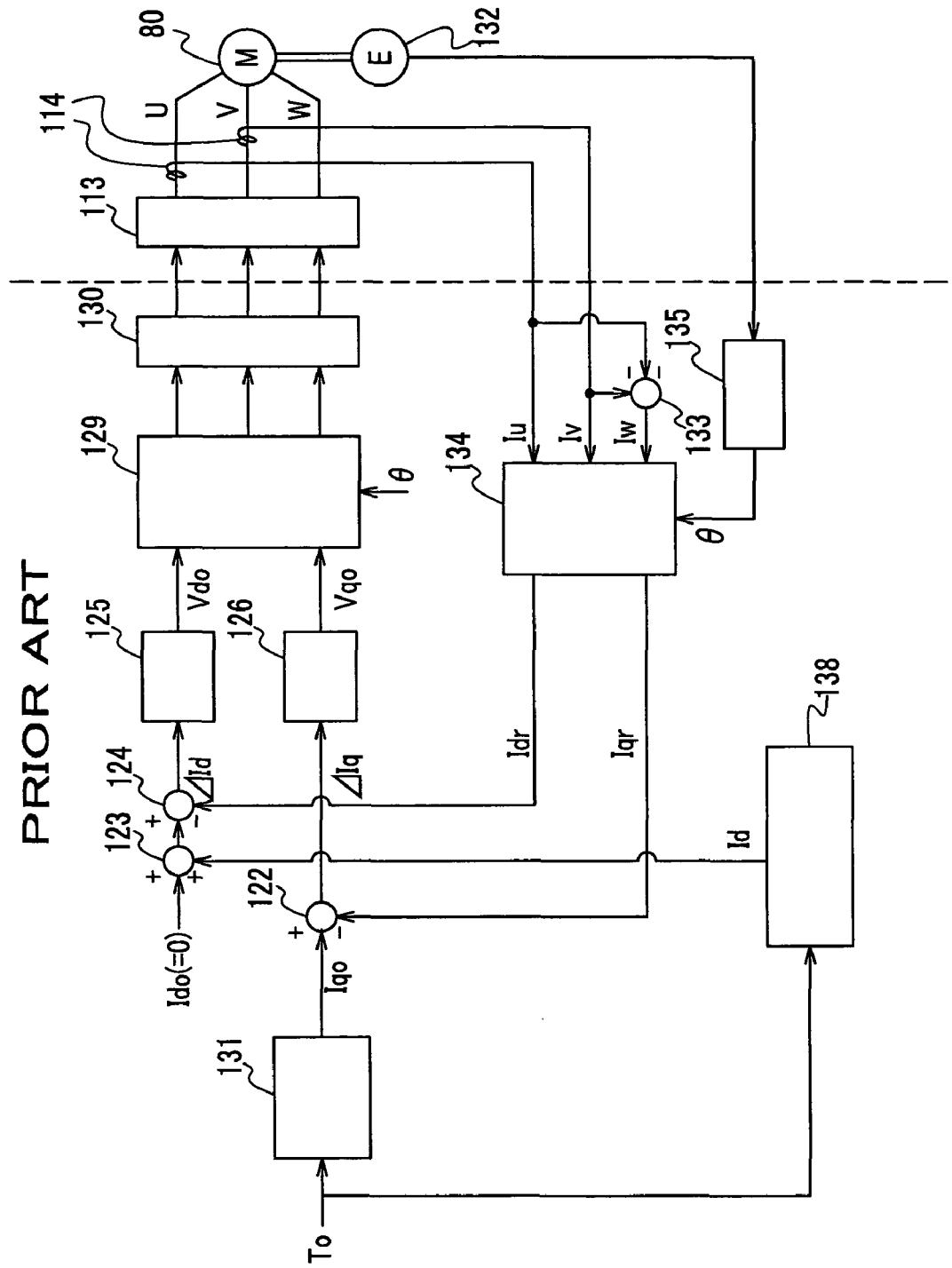
FIG. 5 is a block diagram showing a control unit according to the prior art.

As shown in FIG. 10, a map G1 (Vqo) defining output C1 vs. q-axis command voltage Vqo gives the output C1 of zero for a range of small Vqo, which corresponds to a range of small q-axis current deviation. On the other hand, the map G1 (Vqo) gives a substantially constant output C1 for a range of large Vqo, which corresponds to a range of large q-axis current deviation. In this way, only when a q-axis command voltage Vqo is large, corresponding to a large q-axis current deviation ΔIq, the portion 40 supplies a d-axis compensation current Id so as to weaken the magnetic field within motor 8, thereby increasing the rotational velocity Nm of motor 8. This prevents a current for weakening the magnetic field from running through the motor 8 for a case where the steering wheel 3 is steered slowly and slightly during vehicular travel as shown by the point A3 in FIG. 4, thereby solving a problem associated with unnecessary current supply.

In the present embodiment, a portion 40 for map processing based upon q-axis command voltage, refers to a device for weakening a magnetic field within motor.

The portion 41 determines an output C2, which is a compensation current element obtained by map retrieval addressing with a q-axis actual current Iqr. The portion 41 executes a conversion with an expression (6).

$$C2 = G2(Iqr) \tag{6}$$

Figure 6:
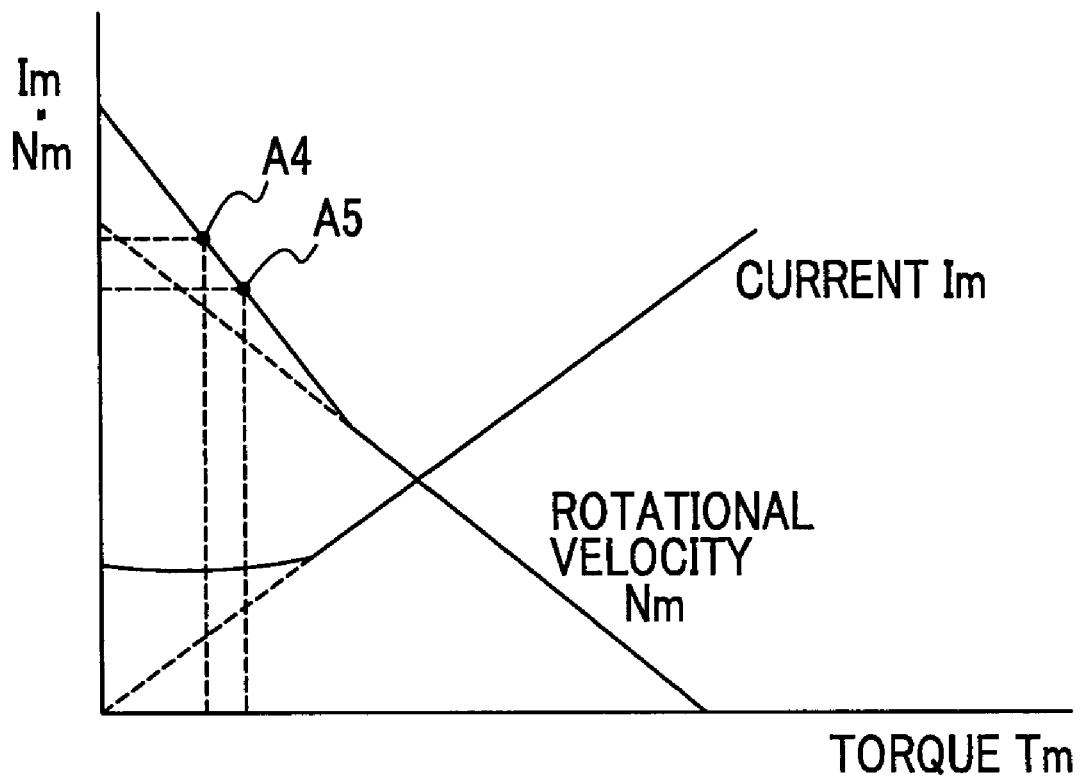
FIG. 6 is a graph illustrating the characteristics of a motor according to the prior art.

As shown in FIG. 11, a map G2 (Iqr) defining output C2 vs. q-axis actual current gives a substantially constant output C2 for a range of small q-axis actual current Iqr. On the other hand, the map G2 (Iqr) gives the output C2 of zero for a range of large q-axis actual current Iqr. In this way, only when a q-axis actual current Iqr is small, the portion 41 supplies a d-axis compensation current Id so as to weaken the magnetic field within motor 8, thereby increasing the rotational velocity Nm of motor 8. This prevents shifting of motor working point from the point A4 to point A5 shown in FIG. 6 for a case where the steering wheel 3 is steered more quickly when the motor 8 is at the upper limit of rotational velocity Nm, thereby solving a problem that a driver feels heavier steering undesirably.

In the present embodiment, a portion 41 for map processing based upon q-axis actual current, refers to a device for weakening a magnetic field within motor in the appended claims.

The portion 43 for map processing determines an output C3, which is a compensation current element obtained by map retrieval addressing with a rotational velocity Nm of motor. The portion 43 executes a conversion with an expression (7).

$$C3 = G3(Nm) \tag{7}$$

As shown in FIG. 12, a map G3 (Nm) gives the output C3 of zero for a range of small rotational velocity Nm of a motor and on the other hand, a substantially constant output C3 for a range of large rotational velocity Nm. This prevents the current for weakening magnetic field from running through the motor 8 for a case where the steering wheel 3 is steered slowly at the point A3 in FIG. 4, thereby solving a problem associated with unnecessary current supply.

In the present embodiment, a portion 43 for map processing based upon motor rotational velocity refers to a device for weakening a magnetic field within motor.

The rotational velocity Nm of a motor is detected by a device for detection of rotational velocity of a motor including a VR resolver 32 and a RD converter 35. The data detected by the device directly enters the portion 43 located in the device 38 for determining d-axis compensation current.

A multiplier 44 executes a multiplication for the output C1 of portion 40, output C2 of portion 41 and output C3 of portion 43. The device 38 for determining d-axis compensation current delivers a d-axis compensation current Id to an adder 23, which is proportional to a multiplication expressed by an expression (8).

$$Id = k \times C1 \times C2 \times C3 \tag{8}$$

In this way, each element participating in the compensation of d-axis current can act independently, thereby supplying d-axis compensation current Id to the motor 8 to weaken the magnetic field for the following cases: where a q-axis current deviation ΔIq or a q-axis command voltage Vqo computed based upon ΔIq is large, where a q-axis actual current Iqr is small and where a motor rotational velocity Nm is large.

A device 39 for controlling interaction and adders 27, 28 electrically connected thereto shown in FIG. 8 are able to eliminate mutual interaction so that a command input can be restricted to affect only a controlled variable when mutual interaction occurs between plural command inputs and controlled variables. In the present embodiment, the device and adders are employed so as to realize a small feedback loop including a d-axis actual current Idr and a q-axis actual current Iqr of the motor 8 to speed up the response thereof.

The device 38 for determining d-axis compensation current according to the present invention compensates a d-axis current, a d-axis component of the motor 8, so that the magnetic field within motor 8 can be weakened when a q-axis command voltage is large, a q-axis actual current is small and a motor rotational velocity is large. In this way, motor rotational velocity can be increased without raising rated current. When a command torque changes steeply, the electric power steering apparatus 1 can exert an optimum assist steering torque on the steering line S by enhancing the response of motor 8. Consequently, the apparatus 1 can provide smooth steering feeling without sacrificing fuel economy and the size of motor 8.

It will now be appreciated from the foregoing description that the present invention is not limited to the particularly illustrated embodiment discussed above and may be carried out in various modified forms.

In the present embodiment, a brushless motor is selected for a motor for exerting assist steering torque. And vector control utilizing dq control, which supplies a sinusoidal current across the phases of brushless motor, is selected for drive control of the brushless motor. Other alternative approaches may be selectable instead of the example described in the present embodiment. For example, it is possible to control a sinusoidal current for each phase of a brushless motor. Also it is possible to supply a rectangle wave current across the phases of a brushless motor and a pseudo sinusoidal current synthesized with rectangle wave currents. Other types of motor may also be alternatively selectable.

What is claimed is:

1. An electric power steering apparatus comprising:

a first device for detection of steering torque of a steering line;

a motor for exerting assist steering torque on the steering line;

a motor drive unit for driving the motor;

a second device for detection of a motor current running through the motor; and a control unit including a third device for determining a target current to be supplied to the motor based on at least a signal of steering torque delivered by the first device and means for generating a signal for motor drive based on at least a deviation between the target current and the motor current and for transmitting the signal for motor drive to the motor drive unit, said target current being based on a compensation current being added to a command current where the command current is determined based on a function of the steering torque and where the compensation current is based on a function of the motor current and not based on a deviation of the target current and motor current, wherein the signal generating means also comprises means for weakening a magnetic field within the motor according to the motor current.

2. The apparatus of claim 1, wherein said magnetic field weakening means executes a conversion in accordance with:

$$C2 = G2(Iqr)$$

where C2 is the compensation current and G2 is the function of motor current, and where C2=0 for a range of large q-axis actual said motor current Iqr and C2 ≠0 when said Iqr is smaller than said range of large said Iqr wherein for this latter case said magnetic field is weakened.

* * * * *